June 9, 1931.  S. PLUMLEY  1,808,968
CUTTING TORCH
Filed July 29, 1929
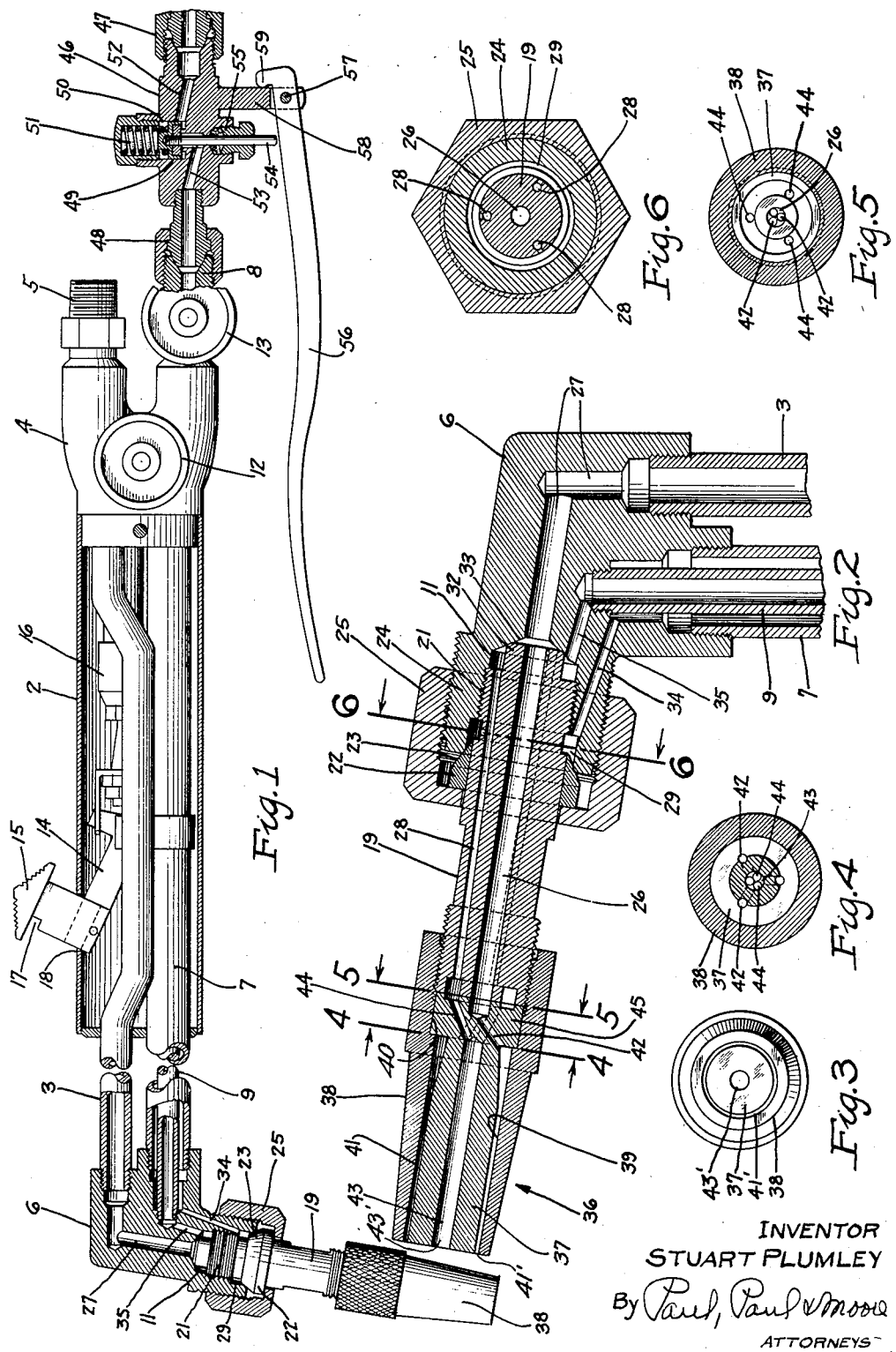
INVENTOR
STUART PLUMLEY
By Paul, Paul & Moore
ATTORNEYS Patented June 9, 1931

1,808,968

UNITED STATES PATENT OFFICE

STUART PLUMLEY, OF MINNEAPOLIS, MINNESOTA, ASSIGNOR TO SMITH WELDING EQUIPMENT CORPORATION, OF MINNEAPOLIS, MINNESOTA, A CORPORATION OF MINNESOTA

CUTTING TORCH

Application filed July 29, 1929. Serial No. 381,926.

This invention relates to new and useful improvements in cutting torches, and an object of the invention is to provide means operable in connection with such a torch whereby the latter may be used as an efficient tool for cutting or burning off the headed ends of rivets.

A further object of the invention is to provide an improved tip for a cutting torch, provided with a large centrally located preheating orifice from which a preheating flame may be projected onto the head of a rivet to quickly preheat it.

A further object is to provide a cutting torch having a tip provided with a centrally located preheating orifice and an annular orifice surrounding said preheating orifice, whereby the rivet head may be first preheated by the projection of a relatively large, solid preheating flame from the centrally located preheating orifice, after which oxygen is delivered to the annular orifice and an annular cutting jet projected therefrom which will burn and consume the head of the rivet, the size of the burning or cutting jet being such that a hole may be burned through the central portion of the rivet head without danger of burning the metal surrounding the edge of the hole through which the rivet is inserted.

A further object is to provide a cutting torch having a tip provided with a centrally located large preheating orifice from which a preheating flame may be projected, and also having an annular orifice surrounding said centrally located orifice from which an annular cutting jet may be projected, and means being embodied in the construction of the torch whereby the preheating flame projected from the central preheating orifice may be cut off, when the work has been sufficiently preheated, and a supply of pure oxygen or cutting fluid delivered thereto, whereby a cutting fluid such as oxygen will be projected from both the annular and the centrally located orifice, resulting in a solid stream of oxygen being projected against the heated rivet head, with the result that the rivet head will be quickly consumed or burned off.

Before the actual operation of burning off a rivet head or the headed over end of a rivet, with oxygen, is started, the head is usually preheated. It is desirable that only the central portion of the rivet head be preheated, and that it be done as quickly as possible, so as not to unnecessarily heat the metal engaged with the bottom of the head. When only the central portion of the rivet head is thus preheated before the cutting action is started, only the central portion of the head of the rivet will be cut away. It is therefore desirable that a comparatively large preheating flame be used so that the head may be preheated quickly and the cutting action started. I have found that several smaller preheating flames will not preheat the work as quickly as one large flame because the heat is less concentrated. Furthermore, several smaller flames located in concentric relation are more or less likely to injure the sheet as the burning of the head of the rivet progresses, because their location must necessarily be around a large cutting jet orifice located close to the periphery of the end of the tip. The preheating flames are therefore so spread apart that they are likely to heat and therefore injure the sheet surrounding the rivet.

From actual experience, I have also found that to obtain a rapid cutting action of the cutting jet, the preheating flame must be eliminated or interrupted before the cutting action is started or simultaneously as it is started. The reason for this is that the luminous cone of the preheating flame produces carbon monoxide and hydrogen gases, both of which are non-oxidizing. These gases tend to protect the central portion of the rivet head from oxidation and thus offset, to some extent, the burning action of the oxygen issuing from the annular orifice. To overcome this difficulty, I provide the acetylene control valve, hereinbefore referred to, by means of which the preheating flame may be completely cut off, as soon as the rivet has been preheated, so that only a cutting jet will be projected from the torch tip, said jet issuing from both the central and annular orifices.

A more specific object of the invention, therefore, is to provide a cutting torch having a tip provided with a comparatively large centrally located preheating orifice and an outer annular orifice, and means being provided for quickly converting the preheating flame into a cutting jet, during operation of the torch, resulting in the projection from the torch tip against the rivet head, of a large solid stream of oxygen, resulting in quick combustion of the rivet head.

Other objects reside in the arrangement of the parts in the torch tip; the size of the annular orifice, whereby the velocity of the gases issuing therefrom will be reduced to a minimum so that the gases will impinge against the heated head of the rivet with as little force as possible; and in the means provided for controlling the flow of acetylene to the central orifice.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings;

Figure 1 is a longitudinal sectional view showing a torch of conventional design with the invention applied thereto;

Figure 2 is an enlarged detail sectional view of the torch head showing the tip mounted therein;

Figure 3 is an end view of my improved torch tip showing the annular orifice and the enlarged centrally located preheating orifice;

Figure 4 is a cross sectional view on the line 4—4 of Figure 2;

Figure 5 is a cross sectional view on the line 5—5 of Figure 2, looking in the direction of the arrows; and Figure 6 is a cross sectional view on the line 6—6 of Figure 2.

In the selected embodiment of the invention here shown, there is illustrated in Figure 1, a cutting torch comprising a handle portion 2 having a conduit 3 therein, one end of which is connected to a fitting 4 provided with a threaded extension 5, whereby the conduit 3 may be connected to a suitable supply of oxygen. The opposite end of the conduit 3 is connected to the usual torch head 6. A relatively larger conduit 7 also has one end connected to the torch head 6 and its opposite end to the fitting 4 and communicates with a threaded extension 8 adapted to be connected to a source of acetylene gas, not shown. A small tube 9 is shown mounted within the conduit 7 and has one end communicating with an annular cavity 11, provided in the head 6 and its opposite end adapted to be connected to the threaded extension 5 by means of a suitable valve 12. A valve 13 controls the supply of acetylene to the conduit 7. The valves 12 and 13 are of ordinary construction, and it is therefore thought unnecessary to show same in detail.

A lever 14, having a finger grip 15, is mounted in the handle portion 2 and is adapted to open and close a valve 16, partially shown in Figure 1. This valve controls the flow of oxygen through the conduit 3. The finger grip 15 is mounted for sliding movement on the lever 14 and is shown provided with a notch 17, adapted to be engaged with the edge 18 of a slot provided in the handle portion 2 to provide means for locking the lever in depressed operative position. The lever is normally retained in closed position, as shown in Figure 1, by means of a spring, not shown. When it is desired to project a cutting jet from the torch tip 19, the lever 14 is depressed and the finger grip moved forwardly until the notch 17 engages the edge 18, whereby the lever is retained in valve-opening position.

The torch tip here shown, comprises an intermediate section 19 provided with a threaded portion 21 adapted to be received in a correspondingly threaded socket provided in the torch head 6. The section 19 also has an annular packing gland 22 having a conical face 23 adapted to be seated against the inner corner of the threaded end portion 24 of the torch head, as shown in Figures 1 and 2, to provide a leak proof connection between the tip and the torch head. A nut 25 locks the tip to the torch head.

The intermediate section 19 of the torch tip has a central bore 26 communicating with the pipe 3 through a duct 27. A plurality of passages 28 are provided in the section 19, and encircle the bore 26, as shown in Figure 6. The inner portions of the passages 28 communicate with an annular chamber 29 and also with the annular cavity 11. The section 19 further has an inner cylindrical end portion 32 which is seated against a frusto-conical seat 33 to prevent leakage of oxygen from the conduit 3 to the annular cavity 11. It is to be understood that the packing gland 23 is mounted for relative movement upon the section 19 so that when the section is secured to the torch head, with its inner end seated against the seat 33, and the nut 25 is screwed onto the threaded end 24 of the head, the gland 23 will be forced tightly against the torch head as shown in Figure 2. The inner end of the gland 23 thus provides one wall of the annular chamber 29. A duct 34 connects the annular chamber 29 with the conduit 7, and a duct 35 in like manner connects the annular cavity 11 with the relatively smaller conduit 9, as best shown in Figure 2.

An important feature of this invention resides in the novel construction of the torch tip which, as shown in Figure 2, comprises the intermediate section 19 and a terminal section 36, the latter including a cylindrical member 37 mounted in axial alinement with the section 19. The member 37 is secured to the section 19 by means of an outer tubular member 38, having one end received in threaded engagement with the section 19, as shown in Figures 1 and 2. The cylindrical member 37 is positioned in a bore 39 provided in the member 38, and which is slightly larger in diameter than the diameter of the member 37, so as to provide a narrow annular passage 41 between the members 37 and 38, terminating in an annular orifice 41'.

The cylindrical member 37 has a head 45 at its inner end fitting into a counterbore 40 provided at the inner end of the member 38. When the member 38 is screwed tightly onto the section 19, as shown in Figure 2, the head 45 will be clamped securely between the end of the section 19 and the bottom of the counterbore 40, whereby the member 37 will be secured in place and will be axially aligned with the outer member 38.

The annular passage 41 communicates with the bore 26 in the intermediate tip section 19 by means of a plurality of small ducts 42 best shown in Figure 2. The tip section 36 also has a central passage 43 communicating with the passages 28 in the intermediate section 19 by means of a plurality of inclined ducts 44. The ducts 42 provide means for directing the cutting fluid from the bore 26 outwardly to the annular passage 41, and the ducts 44 function to direct the gases from the passages 28 inwardly to the central passage 43, provided in the member 37, and which terminates in an orifice 43'.

Means are provided for cutting off the supply of acetylene or fuel gas to the passages 28, and delivering thereto a cutting fluid, such as oxygen, after the work has been preheated to the desired temperature. Such means is shown in Figure 1 and comprises a valve including a body portion 46 having a portion 47 adapted for connection with a suitable supply of acetylene, not shown. The opposite end of the valve body 46 is suitably secured to the threaded extension 8 of the fitting 4, by a suitable connection 48. A valve 49 is slidably mounted in a bore 50 provided in the valve body 46, and is retained in valve-closing position by means of a suitable spring 51. A port 52 connects the bore 50 with the supply of acetylene, and a port 53 connects it with the connection 48 secured to the threaded extension 8 of the torch.

The valve 49 has a stem 54 mounted for sliding movement in a packing 55, and is adapted to be actuated by a lever 56 pivoted at 57 to a depending portion 58 of the valve body 46. The lever 56 has an offset portion 59 which limits the downward movement of the lever, as shown in Figure 1.

In the operation of this novel cutting torch, the extension 5 is connected with a suitable source of oxygen and the valve 46 with a source of acetylene, preferably by means of flexible hose, not shown. Before the cutting operation is started, the work is preheated by opening the valves 12 and 13 and, at the same time, moving the lever 56 upwardly to open the valve 49, thereby permitting a supply of oxygen and acetylene to be delivered to the preheating orifices 28 from whence these gases will be delivered to the central orifice 43 in the member 37 of the terminal tip section 36.

As soon as the work has been preheated to the desired temperature, the valve 16 is opened by depression of the finger grip 15 and, at the same time, the operator will release his grip on the lever 56, thereby cutting off the supply of acetylene or fuel gas to the torch tip. Depression of the finger grip 15 will permit the flow of oxygen through the conduit 3 to the bore 26, from whence it will be delivered to the annular passage 41 by means of the ports 42.

It will thus be seen that an enlarged cutting jet will be projected from the annular orifice 41' which will be augmented by the discharge of oxygen from the central orifice 43 in the tip member 37, with the result that a comparatively large cutting jet will be projected from the torch tip which will have a low velocity, causing it to strike the heated head of the rivet with little force, with the result that the head of the rivet will be consumed by the cutting jet. The effective diameter of the size of the annular orifice 41' through which oxygen is projected onto the rivet head, is a little less than the diameter of the shank of the rivet, thereby causing the hole burned through the central portion of the rivet head to be slightly more than the diameter of the shank.

By the employment of this novel cutting torch, the rivet head may be cut off in a comparatively short time and without danger of burning the plate against which the rivet head may be seated. The provision of the levers 15 and 56 provide means whereby the operator may quickly convert the flame projected from the torch tip from a preheating flame to a cutting jet. The tip, including the intermediate section 19 and the terminal section 36, is so constructed that it may be substituted for torch tips of ordinary construction such as are now commonly used in connection with cutting torches.

I claim as my invention:

1. In a torch, the combination of a head provided with a tip having an enlarged orifice, conduits for supplying fuel and cutting gases to said orifice, said tip also having a narrow annular passage of large diameter encircling said orifice, means connecting said annular passage with the supply of cutting gas, and means for cutting off the supply of fuel gas to said orifice and increasing the flow of cutting gas thereto.

2. In a torch, the combination of a head provided with a tip having an orifice therein connected with supplies of fuel gas and cutting gas, said tip having an annular cylindrical passage encircling said orifice, means for connecting said annular passage with the supply of cutting gas, a valve for completely cutting off the supply of fuel gas to said orifice, and a valve for increasing the flow of cutting gas thereto.

3. In a torch, the combination of a head provided with a tip including intermediate and terminal sections, said intermediate tip section having a bore therein communicating with a supply of oxygen, said section also having a plurality of spaced passages therein arranged to encircle said bore and communicating with the supply of oxygen and also with a supply of acetylene, said terminal tip section being secured to said intermediate tip section and having a central orifice communicating with the spaced passages in said intermediate section, said terminal tip section also having an annular orifice encircling said central orifice and communicating with the bore in said intermediate member, and means for cutting off the supply of acetylene to said central orifice whereby only a cutting jet is projected from the torch tip.

4. In a torch, the combination of a head provided with a tip including an intermediate and a terminal section, said intermediate section having a bore therein communicating with a supply of oxygen and also having a plurality of passages encircling said bore and communicating with the supply of oxygen and also with a supply of acetylene, said terminal tip section being secured to said intermediate section and having a central orifice communicating with the spaced orifices in said intermediate section, said terminal tip section also having an annular orifice arranged to encircle said central orifice and communicating with the bore in said intermediate section, a normally closed valve operable to cut off the supply of acetylene to said central orifice whereby only a cutting jet is projected therefrom, and a valve for increasing the flow of oxygen to said annular orifice.

5. In a torch, the combination of a handle portion provided at one end with a head having a port therein, a tip demountably secured to said head and including an intermediate section and a terminal section, said terminal section comprising a cylindrical member abuttingly engaged with one end of said intermediate tip section, and a tubular member fitting over said cylindrical member and having a threaded engagement with said intermediate section to secure the terminal section thereto, the wall of said tubular member being spaced from the periphery of said cylindrical member to provide an annular passage, and means connecting said annular passage with the port in said head.

6. In a torch, the combination of a handle portion provided at one end with a head having oxygen and acetylene ports therein, a tip demountably secured to said head and including an intermediate section and a terminal section, said terminal section comprising a cylindrical member abuttingly engaged with one end of said intermediate tip section, and an outer tubular member fitting over said cylindrical member and having a threaded engagement with said intermediate section to secure the terminal section thereto, the wall of said tubular member being spaced from the periphery of said cylindrical member to provide a narrow, annular passage, means connecting said annular passage with said oxygen ports, and an orifice in said inner member having means connecting it with said oxygen and acetylene ports.

7. In a torch, the combination of a handle portion provided at one end with a head having oxygen and acetylene ports therein, a tip demountably secured to said head and including an intermediate section and a terminal section, said terminal section comprising a cylindrical member abuttingly engaged with one end of said intermediate tip section, and an outer tubular member fitting over said cylindrical member and having its walls spaced from the periphery of said cylindrical member to provide a narrow, annular passage between said members, means for securing said terminal tip members to said intermediate section, means connecting said annular passage with said oxygen port, an orifice in said inner member having means connecting it with said oxygen and acetylene ports, and valves for controlling the delivery of oxygen and acetylene to said annular passage and said orifice respectively.

In witness whereof, I have hereunto set my hand this 22nd day of July, 1929.

STUART PLUMLEY.